United States Patent [19]

Modler et al.

[11] 3,864,314

[45] Feb. 4, 1975

[54] FLEXIBLE POLYESTER RESINS

[75] Inventors: Robert F. Modler; Stuart A. Harrison, both of Minneapolis, Minn.

[73] Assignee: General Mills Chemicals, Inc., Minneapolis, Minn.

[22] Filed: May 21, 1973

[21] Appl. No.: 362,642

[52] U.S. Cl............... 260/75 R, 156/332, 161/226
[51] Int. Cl............................ C08g 17/06, C09j 3/16
[58] Field of Search.................. 260/75 R; 156/332; 161/226

[56] References Cited
UNITED STATES PATENTS

| 3,436,301 | 4/1969 | McHale | 161/226 |
| 3,505,293 | 4/1970 | Bond et al | 260/75 R |
| 3,682,863 | 8/1972 | McHale | 260/75 R |

*Primary Examiner*—Melvin Goldstein
*Assistant Examiner*—W. C. Danison
*Attorney, Agent, or Firm*—Anthony A. Juettner; Gene O. Enockson; Elizabeth Tweedy

[57] ABSTRACT

Low modulus of elasticity polyesters derived from terephthalic acid, isophthalic acid, heptadecane dicarboxylic acid, and 1,4-butanediol.

1 Claim, No Drawings

FLEXIBLE POLYESTER RESINS

This invention relates to polyesters of 1,4-butanediol condensed with a mixture of acids including heptadecane dicarboxylic, terephthalic acid and isophthalic acid.

More particularly this invention relates to linear polyesters of 1,4-butanediol and terephthalic acid, isophthalic acid and heptadecane dicarboxylic acid having the general formula

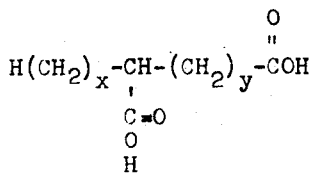

where $x$ is from 1 to 15 and $y$ from 1 to 15 and the total of $x$ and $y$ is 16. In making the polyesters of this invention, the methyl or ethyl esters of the above acids can be used as well as the acids. The methyl ester of the respective acids is preferred as a starting material.

In the final condensation product the 1,4-butanediol component and the total of acid components are present in substantially a 1:1 equivalent ratio. Preferably the individual acid equivalent percentages of the total acid equivalents are about 73 to 85 percent terephthalic acid, about 10 to 22 percent isophthalic acid and about 5 to 10 percent heptadecane dicarboxylic acid. The polyesters are of sufficient molecular weight to produce inherent viscosities of about 0.4 to 1.0 measured in orthocholorophenol solvent, at a concentration of 0.5 percent by weight and at a temperature of 30°C.

These new linear polyesters are hot melt adhesives particularly useful as adhesives in making shoes. They set quickly to a hardness which permits smoothing by sanding, an essential in shoe manufacture. Heretofore polyesters of 1,4-butanediol and mixtures of terephthalic acid, isophthalic acid and sebacic acid have been used as shoe adhesives. It has been found that the polyesters of the present invention set to a comparable hardness but have a far greater capacity for elongation and therefore are more flexible than the adhesives made from sebacic acid.

DETAILED DESCRIPTION OF THE INVENTION

The heptadecane dicarboxylic acids useful in making the polyesters of this invention can be prepared by the addition of carbon monoxide and water to an unsaturated fatty acid, preferably oleic acid. Preparation is shown in Reppe and Kroper, Ann. 582, 63–65 (1953) and the reaction involved is illustrated graphically below:

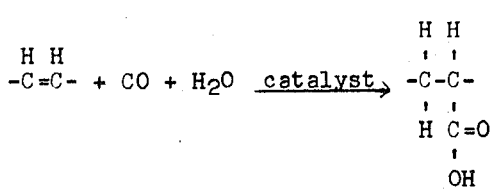

where $-C=C-$ represents the ethylene unsaturation of the fatty acid molecule.

An alternative method is to react the carbon monoxide and unsaturated fatty acid in the presence of hydrogen to get the aldehyde or alcohol or mixtures thereof which are then oxidized to the acid as shown below:

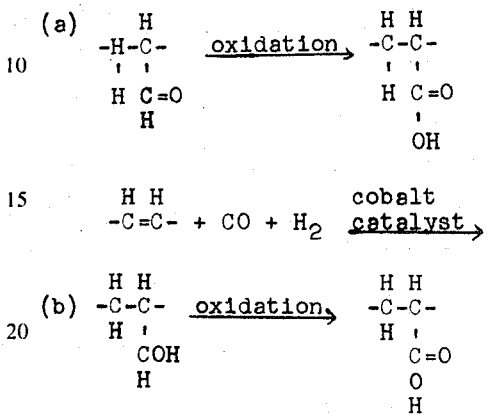

The final acid product is a mixture of isomers having one more carbon atom than the starting material. Starting with a $C_{18}$ unsaturated fatty acid such as oleic acid, the final product will be a mixture of isomers of $C_{19}$ dicarboxylic acids or heptadecanedicarboxylic acids. The product might also be regarded as a stearic acid substituted with a carbonyl group along the fatty chain.

The preferred acid employed in this invention is the $C_{19}$ dicarboxylic acids prepared from the oxonation of oleic acid. However, other $C_{18}$ unsaturated fatty acids such as linoleic, linolenic, ricinoleic and elaidic or mixtures thereof may be employed.

The isophthalic and terephthalic acids included in the polyester have the respective formulas:

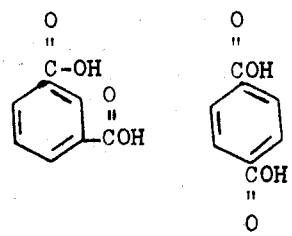

isophthalic acid    terephthalic acid

The above acids, in the form of the acid, their methyl or ethyl esters, are condensed with 1,4-butanediol which has the formula
$HOCH_2CH_2CH_2CH_2OH$ The formation of the polyesters takes place in two steps. The first step involves the formation primarily of the bisglycol esters from the reaction of the 1,4-butanediol with the various acids of the methyl or ethyl esters thereof. Respectively the byproducts formed are water, methanol and ethanol. The progress of the reaction can be measured by observing the amount of byproduct formed. The reaction can be conducted by heating the reaction mixture to a temperature of about 150°C. to 250°C. preferably by slowly raising the temperature from about 150 C. to about 250 C. The reaction is preferably conducted in the presence of a catalyst. To avoid discoloration the reaction is preferably conducted in an atmosphere of an inert gas, i.e., nitrogen. The second step of the polyester formation is the final polymer formation. The final polymerization is carried out under vacuum in the order of about 0.2 to 10 mm. Hg. at a temperature of about 240 C. to 260 C. Preferably the pressure is gradually reduced from the pressures used in the first step, about 700 mm. Hg. to about 10 mm. of Hg. or less. Preferably a final pressure of less than about 5 mm. Hg. is obtained. The reaction mixture is held at this pressure until the desired molecular weight is achieved. The degree of polymerization is a function of the degree of vacuum applied and the time.

It is preferred that both steps of the reaction be conducted in the presence of a polymerization catalyst. Useful catalysts include titanium compounds such as tetra n-butyl orthotitanate, tetra amine titanate, lead salts such as lead acetate, tin compounds such as dibutyl stannic oxide and antimony compounds such as antimony oxide.

The mechanical properties of polyesters can be characterized on an Instron Tensile Tester Model TTC using ASTM 1708-59T procedure. The polyamide is compression molded into a 6 inch  6 inch sheet of approximately 0.04 inch thickness, at a temperature near its melting point (usually a few degrees lower than the melting point) and at 40,000 lbs. load or higher using cellophane as the parting agent in the mold. From this sheet, test specimens are die cut to conform to ASTM 1708-59T. The test specimen is clamped in the jaws of the Instron Tester. Cross head speed is usually 0.5 inch/minute at 100 pounds full scale load. Chart speed is 0.5 inch/minute.

Tensile strength (reference: ASTM D-1708-59T) is calculated as:
Ultimate tensile strength  maximum load in pounds/cross sectional area (sq. in.)
Percent elongation is calculated as:
Percent elongation  gage length at break - gage length at 0 load  100/gage length at 0 load
In addition to tensile strength and elongation, the following properties of the polymers prepared were measured according to:
1. Ball and ring softening point - ASTM E28-58T
2. 2 percent Tensile modulus - ASTM D1530-58T
3. Yield stress - ASTM D638-60T Set out below in an example of a typical procedure for making the polyesters and illustrations of polyester compositions. Also shown are the properties of polyesters heretofore used in shoe manufacture and corresponding properties of the polyesters of this invention.

EXAMPLE I

The equipment employed was a stainless steel reactor with a glass top and fitted with a high powered air driven stirrer, a nitrogen inlet tube, a thermocouple connection, and an outlet to a column with a thermometer at the head and take off adapter to a condenser and receiver. The heating of the reactor was controlled by an automatic pyrometer, which was connected to the thermocouple. Heating tape was used to heat the upper (glass) part of the reactor, and both water aspirator and high vacuum (via pump) could be applied through the receiver.

1,4-Butanediol (GAF Tech Grade, 296 g., 3.29 moles) was charged into the reactor, which was then heated to 125 C. Aspirator vacuum was applied for 15 minutes to remove water and other volatiles.

Nitrogen was then passed into the reactor, and the reactor opened. Dimethyl terephthalate pellets (American Oil Co.), 194 g., 1.00 mole, and tetra-n-butyl orthotitanate (Tyzor TBT, duPont), 10 drops, were added to the reaction mixture. The system was flushed with nitrogen and heated to 150 C. The dimethyl terephthalate was observed to melt at 135 C., after which high powered stirring was begun. Methanol began to appear at the top of the column soon after the reaction temperature reached 150 C.

The temperature was held at 150 C. for 2 hours and then allowed to increase to 180 C., where it was held for an additional   hour. By this time 55 g. of distillate was collected.

The column was removed, and a mixture of 85 percent isophthalic acid and 15 percent terephthalic acid (American Oil Co.), in the amount of 58.4 g. (0.054 mole terephthalic acid and 0.299 mole isophthalic acid), heptadecane dicarboxylic acid (derived from oleic acid BASF), 27.0 g., (0.082 mole), and tetraamine titanate (Tyzor TE duPont), 10 drops, were added. The system was flushed with nitrogen, and a very slow stream was continuously passed through the system for the next hour (to facilitate removal of water liberated in the reaction), during which the temperature was held at 180 C.

Carefully, water aspirator vacuum was applied. At this stage some very small amounts of unreacted dimethyl terephthalate may sometimes be observed to sublime. The temperature was gradually increased over the next hour to 200 C. At 200 C. high vacuum was applied and the temperature increased to 260 C. The final pressure was 0.5 mm. Hg. Upon reaching the desired melt viscosity, vacuum was released to a nitrogen atmosphere, and the molten polymer was dumped onto a Teflon board. The product had a ball and ring melting point of 196 C. and an inherent viscosity of 1.002.

EXAMPLE II

The following polyester compositions were made using the procedure of Example I:

| | Composition Equivalent Percent | | | | |
|---|---|---|---|---|---|
| | Terephthalic Acid | Isophthalic Acid | Heptadecane Dicarboxylic Acid | Ball and Ring M.P. C. | Inherent viscosity |
| 1.* | 73.1 | 21.2 | 5.7 | 196 | 1.002 |
| 2. | 80 | 10.6 | 9.4 | 200 | .397 |
| 3. | 78.2 | 15.6 | 6.2 | 207 | .951 |
| 4. | 78.2 | 15.6 | 6.2 | 200 | .699 |
| 5. | 73.4 | 20.9 | 5.7 | 185 | .459 |

* Product of Example I

EXAMPLE III

The following data illustrate the greater elongation capacity of the polyesters of the present invention than that found in hot melt adhesives commonly used in shoe manufacture:

| Composition | Ultimate Tensile Strength | % Elongation | 2% Modulus | Yield Stress |
|---|---|---|---|---|
| Example II, Comp. 3 | 6350 | 472 | 50,100 | 3370 |
| Example II, Comp. 4 | 4620 | 359 | 57,600 | 3400 |
| Sebacic Acid Modified Polyester* | 4620 | 22 | 44,800 | 2810 |

* A polyester containing 1,4-butanediol, 70 equivalent percent terephthalic acid, 10 equivalent percent isophthalic acid and 20 equivalent percent sebacic acid having a Ball and Ring Melting Point of 190°C. and Inherent Viscosity of .596.

The embodiments of the invention in which an exclusive property or privilege is claimed are defined as follows:

1. A polyester having an inherent viscosity of about 0.4 to 1.0 measured in orthochlorophenol solvent, at a concentration of 0.5 percent by weight and at a temperature of 30°C. consisting essentially of the condensation product of 1,4-butanediol, terephthalic acid, isophthalic acid and heptadecane dicarboxylic acid having the formula

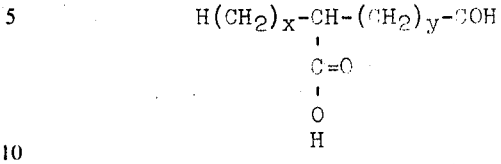

where $x$ is from 1 to 15, $y$ from 1 to 15 and the sum of $x$ and $y$ is 16, wherein the 1,4-butanediol component and the total acid component are in an equivalent ratio of about 1:1 and the equivalent percent of the acids based upon the total acid equivalent are about 73 to 85 equivalent percent terephthalic acid, about 10 to 22 equivalent percent isophthalic acid and about 5 to 10 equivalent percent heptadecane dicarboxylic acid.

* * * * *

UNITED STATES PATENT OFFICE
CERTIFICATE OF CORRECTION

Patent No. 3,864,314　　　　　Dated Feb. 4, 1975

Inventor(s) Robert F. Modler; Stuart A. Harrison

It is certified that error appears in the above-identified patent and that said Letters Patent are hereby corrected as shown below:

Col. 3, line 1 "150 C" should read - 150°C -
Col. 3, line 1 "250 C" should read - 250°C -
Col. 3, line 8 "240 C" should read - 240°C -
Col. 3, line 8 "260 C" should read - 260°C -
Col. 3, line 27 "6 inch　6 inch" should read - 6 inch x 6 inch -
Col. 3, line 39 "strength　maximum" should read
　　　　　　　- strength = maximum -
Col. 3, line 42 "elongation　gage" should read
　　　　　　　- elongation = gage -
Col. 3, line 43 "0 load　100/gage" should read
　　　　　　　- 0 load x 100/gage -
Col. 3, line 50 "in" should read - is -

Col. 4 is incorrectly numbered and the corrections show lines
　　as actually counted from the top of the column Col. 4, line 3 "125 C" should read - 125°C -
Col. 4, line 10 "150 C" should read - 150°C -
Col. 4, line 11 "135 C" should read - 135°C -
Col. 4, line 14 "150 C" should read - 150°C -
Col. 4, line 15 "150 C" should read - 150°C -
Col. 4, line 16 "180 C" should read - 180°C -
Col. 4, line 17 "additional　hour" should read
　　　　　　　- additional 1/2 hour -
Col. 4, line 30 "180 C" should read - 180°C -
Col. 4, line 35 "to 200 C" should read - to 200°C -
Col. 4, line 35 "At 200 C" should read - At 200°C -
Col. 4, line 36 "260 C" should read - 260°C -
Col. 4, line 41 "196 C" should read - 196°C -
Col. 4, line 54 "M.P. C" should read - M.P. °C -

Signed and sealed this 27th day of May 1975.

(SEAL)
Attest:

RUTH C. MASON
Attesting Officer

C. MARSHALL DANN
Commissioner of Patents
and Trademarks